United States Patent [19]

Tanaka et al.

[11] Patent Number: 5,797,717

[45] Date of Patent: Aug. 25, 1998

[54] AIR CONDITIONING CONTROL UNIT

[75] Inventors: Hitoshi Tanaka; Shunji Fujita, both of Kanagawa, Japan

[73] Assignee: Yamatake-Honeywell Co., Ltd., Tokyo, Japan

[21] Appl. No.: 622,148

[22] Filed: Mar. 27, 1996

[30] Foreign Application Priority Data

Mar. 30, 1995 [JP] Japan .................. 7-073810

[51] Int. Cl.⁶ .................................................. F04B 49/00
[52] U.S. Cl. ...................... 417/14; 417/44.1; 62/158
[58] Field of Search ............................ 417/14, 44.1, 32; 62/158, 186; 236/49.3; 165/299

[56] References Cited

U.S. PATENT DOCUMENTS

| 4,142,375 | 3/1979 | Abe et al. ................ 62/158 |
|---|---|---|
| 4,502,290 | 3/1985 | Suzuki et al. ............. 62/229 |
| 5,193,742 | 3/1993 | Byun .................... 236/49.3 |
| 5,323,961 | 6/1994 | Hurmi .................... 165/299 |
| 5,335,708 | 8/1994 | Murakami et al. ......... 165/299 |

FOREIGN PATENT DOCUMENTS

1131929  9/1989  Japan .

*Primary Examiner*—Ayaz R. Sheikh
*Assistant Examiner*—Xuan M. Thai
*Attorney, Agent, or Firm*—Rothwell, Figg, Ernst & Kurz

[57] ABSTRACT

A contactless output section makes a circuit including a fan motor and an ac power source when a receive portion receives a command signal. A diode bridge and a direct current regulated circuit smooth and regulate dc current. An operation part is provided with power from the direct current regulated circuit, compares a measured temperature with a set temperature, and generates and provides a command signal for the receive portion of the contactless output section.

11 Claims, 7 Drawing Sheets

(PRIOR ART)

AIR CONDITIONING CONTROL UNIT

BACKGROUND OF THE INVENTION

1. Field of the Invention

The present invention relates to an air conditioning control unit suitable for a fan coil unit (hereinafter referred to as FCU).

2. Description of the Related Art

In an air conditioning system employing an FCU, a heat exchange medium such as cold or warm water is generated by a heat source such as a cooling tower or a boiler installed in a building, or by direct heating and cooling DHC, and is supplied through piping to the FCU which is mounted, for example in the roof-spaces of each room in a building. While the heat exchange medium passes through a coil (heat exchanger) of the FCU, a fan (air blower) supplies a flow of air through to the coil, thereby performing heat exchange between the heat exchange medium and air in the room to maintain a comfortable room temperature.

In general classification, techniques to adjust the room temperature are:

1) a method in which an air flow of the fan is adjusted (but an amount of water passing through the coil is not controlled);
2) a method in which a control valve is used to adjust the amount of water passing through the coil (but the air flow of the fan is not controlled); and
3) a method in which both the air flow and the amount of passing water are adjusted.

The present invention is applicable to any one of the above methods 1 to 3. However, for the sake of simplicity, the following description will chiefly be given of the method 1.

Figure 7:
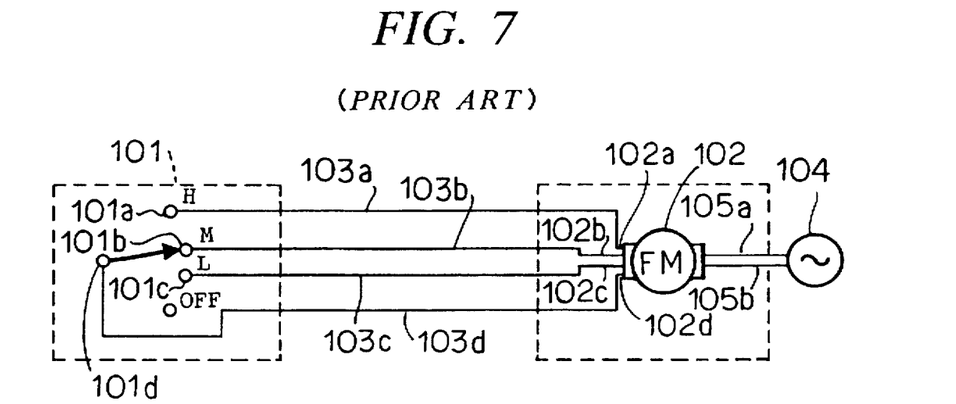
FIG. 7 is a circuit diagram showing a conventional control unit for a fan motor.

In the prior art, two types of fan air-flow adjusting apparatus have been available including a manual air-flow change-over apparatus, and an electronic automatic air-flow change-over apparatus disclosed in Japanese Utility Model Publication (Kokai) No. 1-131929. In the manual air-flow change-over apparatus, as shown in FIG. 7, high, medium, low, and off terminals 101a to 101d of an air-flow change-over switch 101 are connected to fan speed change-over terminals 102a to 102d of a fan motor 102 through wires 103a to 103d, and the fan motor 102 is connected to a power source 104 through wires 105a and 105b. A switch box specified by JIS (Japanese Industrial Standard) for example is embedded in an interior wall surface of the room, and the air-flow change-over switch 101 is mounted to the switch box. The FCU accommodating the fan motor 102 is mounted in the roof space. The wires 103a to 103d extending between the air-flow change-over switch 101 and the fan motor 102 are mounted in the wall in view of, mainly, aesthetic request so that the wires can not be seen from the inside of the room. In this case, a resident of the room has to manually operate the air-flow change-over switch 101 so as to adjust the room temperature (the air-flow change-over mode may include another simple start/stop change-over mode instead of the above multi-step change-over mode). In case of the manually adjusting apparatus, the resident must frequently adjust the air flow to keep a constant room temperature.

Further, the electronic automatic air-flow change-over apparatus includes a controller mounted on, for example, the interior wall surface of the room, and a power unit mounted in the vicinity of the FCU (for example, in the roof space). A control signal is sent from the controller to the power unit, and the power unit automatically adjusts the air flow of the fan such that the room temperature can reach a set temperature set by the resident. The controller includes room temperature sensing means for measuring the room temperature, temperature setting means for setting a room temperature desired by the resident, and control means for comparing a measured room temperature with a set value to determine the number of revolution of the fan motor. On the other hand, the power unit includes a power source portion to supply power to the fan motor, the controller, and the power unit itself, and a control circuit to control the fan motor depending upon an air-flow signal from the controller. In case of the automatically adjusting apparatus, the room temperature can automatically be held in the vicinity of the set temperature, thereby eliminating the need for control of the air-flow by the resident.

As set forth above, even when, instead of the fan motor, a solenoid valve or a motor-operated valve is set as a control target (load), the same holds true. In such a case, opening of the valve is controlled to adjust a flow rate of the heat medium in the coil.

In recent years, the needs of the marketplace have been increased in that, for improvement of a living environment, the existing manually adjusting apparatus is replaced by the electronic automatic adjusting apparatus to automate the FCU. Additionally, in construction of new houses, there has been desired a small and inexpensive air conditioning control unit which can be installed by easy operation. However, since the conventional air conditioning control unit has the above structure, the needs can not be realized due to the following problems, and automation of the FCU is not widely available.

A) Since it is necessary to mount an additional power unit in, for example, the roof space in the vicinity of the FCU, there are problems in that the additional power unit can not be mounted due to the lack of a mounting space, and difficult work may be costly.

B) It is necessary to remove the existing wires 103a to 103d from the inside of the wall, and connect the wires to a power unit mounted in the roof space. On the other hand, it is necessary to mount in the wall additional signal lines and power lines extending between the power unit and the controller in the room, and additionally connect the power wires 105a, 105b for the fan motor to the power unit. The above complicated operations result in difficult work, thereby increasing cost.

C) The controller and the power unit are discretely manufactured so that, for example, two housings are required. Consequently, the number of parts is increased, resulting in an expensive apparatus.

SUMMARY OF THE INVENTION

In order to overcome the above problems, it is a main object of the present invention to provide an air conditioning control unit in which:

a) a function of a power unit can integrally be incorporated in a housing of a controller to eliminate an independent power unit;

b) the controller of the invention can be sized to directly be mounted to a standardized switch box, for example JIS switch box, because the air conditioning control unit is frequently mounted in the standardized switch box embedded in an interior wall surface of a room; and c) existing wires 103a to 103d extending between a manually adjusting apparatus and an FCU can be used with no modification, and power for actuating the controller can be fed through the wires 103a to 103d, thereby eliminating the need for an additional wire.

It is another object of the present invention to provide an air conditioning control unit which has a circuit structure having a low heat value, and is specially suitable for embedding in a wall like installation into an existing standardized switch box, for example JIS switch box, used to mount a manual air-flow change-over apparatus.

It is still another object of the present invention to provide an air conditioning control unit in which erroneous connection can extremely be reduced, and a connecting operation can be facilitated.

It is a further object of the present invention to provide an air conditioning control unit in which a dc circuit can stably be operated by an ac power source.

According to the present invention, for achieving the above-mentioned objects, there is provided an air conditioning control unit including a contactless output section making a circuit including an ac power source so as to drive a load in response to a command signal, current conversion means for converting ac current flowing through the load from the ac power source to dc current, and an operation part receiving power from the current conversion means, and comparing a measured room temperature with a set temperature so as to produce and feed the command signal to the contactless output section. In the present invention, it is possible to eliminate the need for a discrete power unit. Further, when a conventional manually adjusting apparatus is replaced, it is possible to realize automatic control of an FCU by using existing wires extending between the manually adjusting apparatus and the FCU with no modification. In addition, power supply for a load such as a fan motor or a control valve is controlled by this unit.

According to one aspect of the present invention, there is provided an air conditioning control unit including air flow changing means having a plurality of revolution change-over terminals for changing revolution of a fan motor as the load and a common terminal connected to one of the revolution change-over terminals. In this aspect, the contactless output section makes the circuit including the ac power source through the common terminal of the air flow changing means.

According to another aspect of the present invention, there is provided an air conditioning control unit in which the contactless output section comprises a plurality of contactless output portions, each having a diode bridge connected between each of a plurality of revolution change-over terminals and the ac power source, and a thyristor connected with an output side of the diode bridge and conducting in response to the command signal, the current conversion means is connected to one of the revolution change-over terminals, and the operation part comprises an automatic adjusting means for determining a revolution change-over terminal to be connected with the common terminal among the revolution change-over terminals according to a difference between the measured room temperature and the set temperature and providing the command signal for the contactless output portion corresponding to the revolution change-over terminal to be connected with the common terminal. In this construction, power supply for a load such as a fan motor or a control valve is full-automatically controlled by this unit.

According to still another aspect of the present invention, there is provided an air conditioning control unit in which the contactless output section comprises a plurality of contactless output portions, each having a triac connected between each of a plurality of revolution change-over terminals and the ac power source, and means for making the triac to be conducted in response to the command signal, the current conversion means is connected to one of the revolution change-over terminals, and the operation part comprises an automatic adjusting means for determining a revolution change-over terminal to be connected with the common terminal among the revolution change-over terminals according to a difference between the measured room temperature and the set temperature and providing the command signal for the contactless output portion corresponding to the revolution change-over terminal to be connected with the common terminal. Since the contactless output portion in this aspect includes the triac as a basic component, there are effects in that the circuit can be formed to have a lower heat value.

According to further aspects of the present invention, there is provided an air conditioning control unit in which the operation part includes means for determining characteristics of respective revolution change-over terminals based on current value flowing respective triacs. According to this aspect, the wires other than the common wire can be freely connected while the common wire is correctly connected. As a result, erroneous connection can be reduced, and a connecting operation can be facilitated.

According to still further aspects of the present invention, there is provided an air conditioning control unit, further including a delay circuit to delay command signal transmitting timing to the contactless output portion. Since the direct current regulated circuit supplies power for components such as operation part and contactless output section or portions through the delay circuit so that the power can be supplied after sufficient accumulation thereof, it is possible to stabilize and ensure the operation of components such as operation part, and contactless output portion.

DETAILED DESCRIPTION OF THE PREFERRED EMBODIMENTS

Embodiment 1

Figure 1:
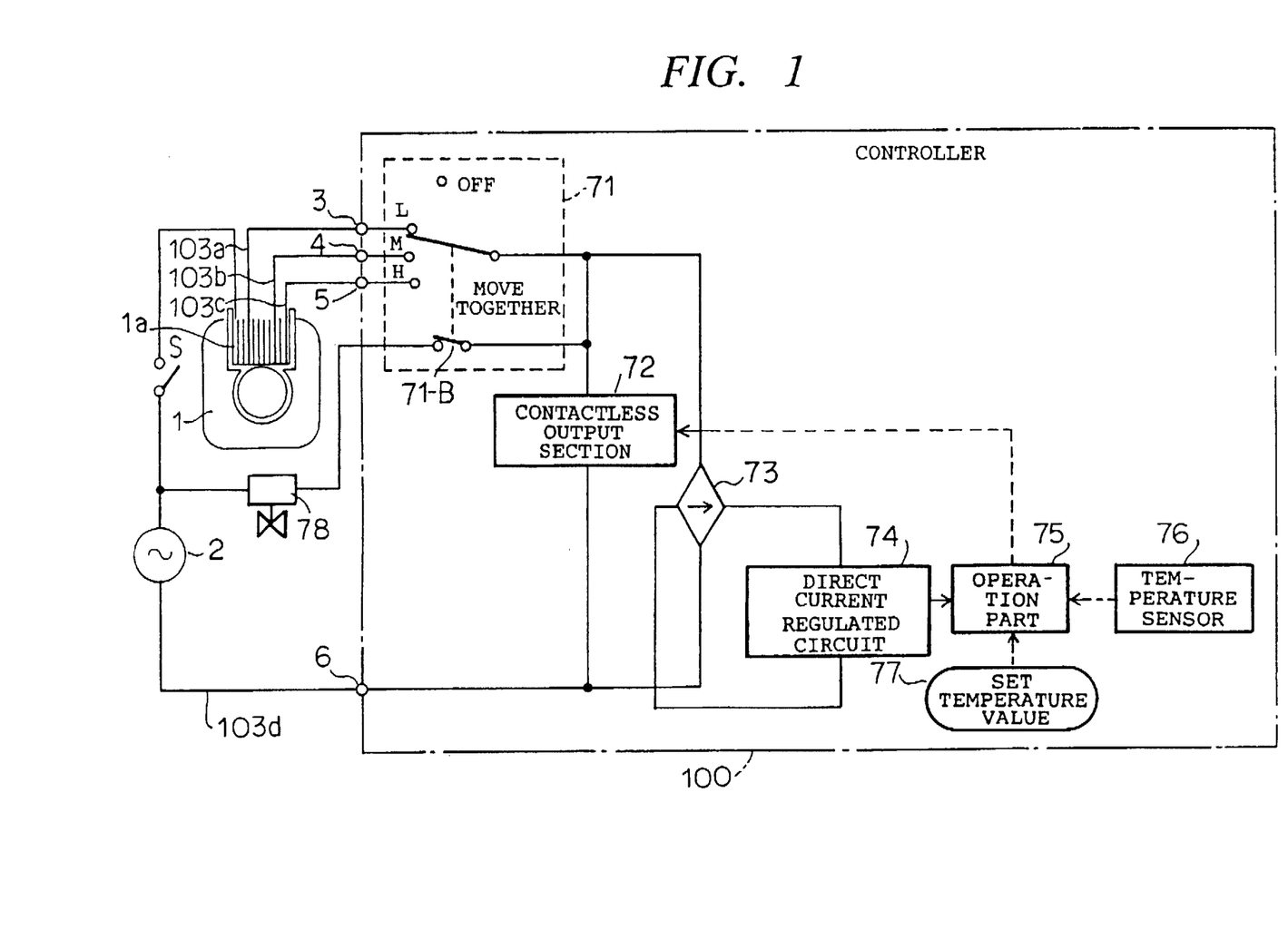
FIG. 1 is a circuit diagram showing an air conditioning control unit according to the first embodiment of the present invention.

Preferred embodiments will now be described with reference to the accompanying drawings. FIG. 1 is a circuit diagram showing a structure of the first embodiment. In FIG. 1, reference numeral 1 means a fan motor (such as induction motor) in which one end of a coil 1a is connected to one end of an ac power source 2, 3 to 5 are fan speed change-over terminals connected to branch points of the coil 1a, and 6 is a common terminal connected to the other end of the ac power source 2. A controller part 100 is shown on the right side with respect to the terminals 3 to 6, and is connected to the coil 1a of the fan motor through wires 103a to 103d (which may be existing wires) shown in FIG. 7. Reference numeral 71 means a rotary switch which is manually operated for sequential change of the fan speed change-over terminals 3 to 5. Reference numeral 72 means a contactless output section, and 73 is a diode bridge, both of which are connected in parallel with a series circuit including the fan motor 1 and the ac power source 2 through the rotary switch 71. Reference numeral 74 means a direct current regulated circuit for voltage regulation/smoothing of rectified output from the diode bridge 73, and 75 is an operation part which is supplied with power from the direct current regulated circuit 74, and is connected to a temperature sensor 76 and temperature setting means 77. Reference numeral 78 means a control valve connected between one end of the ac power source 2 and one end of the contactless output section 72 through a switch 71-B working with the rotary switch 71. In this case, when the rotary switch 71 is OFF, the switch 71-B is also OFF. When the rotary switch 71 is set to any one of terminals L, M, and H, the switch 71-B is turned ON.

A description will now be given of the operation. An air flow volume of the fan motor 1 is set by user's manual operation to set the rotary switch 71 to any one of the terminals H "High Velocity," M "Medium Velocity," and L "Low Velocity." When a power source switch S is closed in this state, the rectified current rectified in the diode bridge 73 is converted into direct current in the direct current regulated circuit 74 to be fed to the operation part 75. The operation part 75 compares a measured room temperature from the temperature sensor 76 with a set temperature from the temperature setting means 77, and feeds an ON control command to the contactless output section 72 such that the room temperature can approach the set temperature. Subsequently, after the room temperature sufficiently approaches the set temperature, an OFF command is fed to the contactless output section 72. On the other hand, when the contactless output section 72 is in an ON operation, the fan motor 1 is operated to provide an air flow set by the rotary switch 71. In case of an OFF operation, the fan motor is stopped so that the room temperature can be held in the vicinity of the set temperature. It will be appreciated that an operation gap having a predetermined temperature range is provided between the ON operation and the OFF operation, and the structure is designed to prevent repetition of the ON/OFF operations in a short time (chattering).

Though the rotary switch 71 is mounted for the change-over of the plurality of fan speed change-over terminals of the fan motor 1, the rotary switch can be eliminated in case of a fan motor having no fan speed change-over terminal (i.e., a fan motor simply including a start/stop mode).

As described above, according to the structure shown in FIG. 1, the controller 100 having an automatic adjusting function can be set while existing wires 103a to 103d are used as power lines as they are, in case an existing manual adjusting apparatus is replaced with an electronic automatic adjusting apparatus. Further, as the controller 100 has the functions of conventional power units, it is not required to mount an additional power unit in, for example, the roof space.

Embodiment 2

Figure 2:
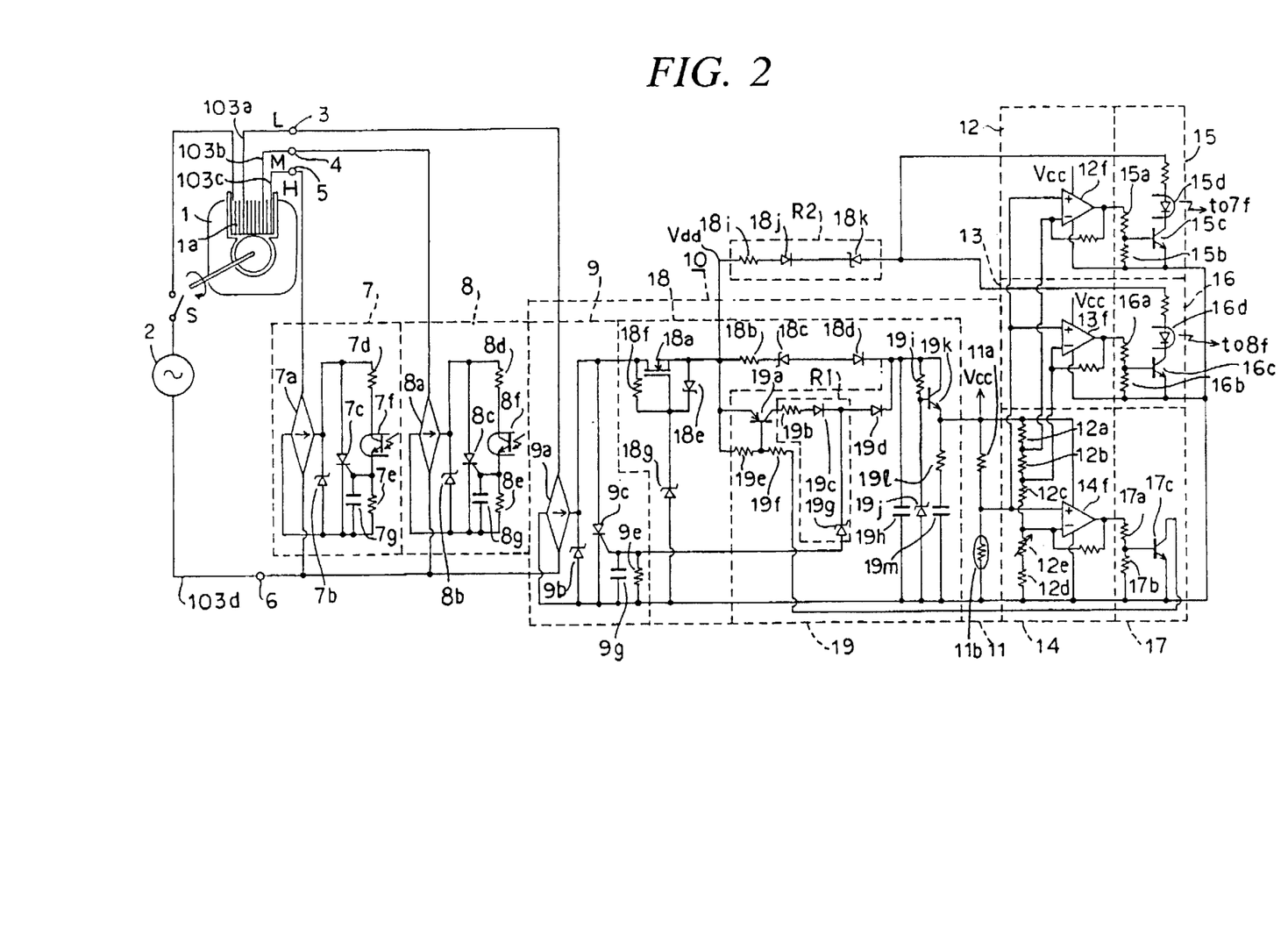
FIG. 2 is a circuit diagram showing an air conditioning control unit according to the second embodiment of the present invention.

FIG. 2 is a circuit diagram showing a structure of the second embodiment. The same reference numerals are used for component parts identical with those in the first embodiment shown in FIG. 1, and descriptions thereof are omitted. In FIG. 2, reference numerals 7 to 9 mean receive portions of contactless output portions connected between revolution change-over terminals 3 to 5 and a common terminal 6, 10 is a direct current conversion circuit with the receive portion of the contactless output portion as a partial component part, and 11 is a temperature measuring portion to measure a room temperature. Reference numerals 12 to 14 mean operation parts, and 15 to 17 are transmit portions of the contactless output portions, both of which are supplied with power from the direct current regulated circuit 10.

The receive portion 7 of the contactless output portion includes a diode bridge 7a connected to the revolution change-over terminal 5, a Zener diode 7b and a thyristor 7c connected in parallel with an output terminal of the diode bridge 7a, a series circuit having resistors 7d and 7e and a receiving phototransistor 7f of a photo-coupler, which are connected in parallel with the thyristor, and a capacitor 7g connected to a gate of the thyristor. Since the receive portion 8 of another contactless output portion has the same structure as that of the receive portion 7 of the contactless output portion, equivalent reference numerals are used for component parts and descriptions thereof are omitted. A receive portion 9 of the contactless output portion has the same structure as that of the receive portion 7 or 8 of another contactless output portion except that a gate signal for a thyristor 9c is received from the direct current conversion circuit 10 instead of using the receiving phototransistor.

The direct current regulated circuit 10 includes the receive portion 9 of the contactless output portion, a voltage regulating circuit 18, and a regulator circuit 19.

The voltage regulating circuit 18 includes an FET transistor 18a, a resistor 18b, a Zener diode 18c, a diode 18d which are connected in series with an output terminal of the receive portion 9 of the contactless output portion, a resistor 18f connected between a drain and a gate of the FET transistor 18a, a Zener diode 18e connected between a source and the gate thereof, and a Zener diode 18g connected to the gate.

The regulator circuit 19 includes a series circuit having a transistor 19a, a resistor 19b, a diode 19c and 19d, and are connected in parallel with the resistor 18b, the Zener diode 18c and the diode 18d of the voltage regulating circuit 18, voltage dividing resistors 19e and 19f connected to a base of the transistor 19a, a Zener diode 19g connected to a connecting point between the diodes 19c and 19d, a capacitor 19h connected in parallel with an output terminal of the voltage regulating circuit 18, a series circuit having a resistor 19i and a Zener diode 19j, and a series circuit having a transistor 19k whose base is connected to a connecting point between the resistor 19i and the Zener diode 19j, a resistor 19l, and a capacitor 19m. Further, the temperature measuring portion 11 including a resistor 11a and a temperature sensor 11b such as thermistor is connected in parallel with the series circuit including the resistor 19l and the capacitor 19m.

The operation parts 12 to 14 respectively include comparing circuits 12f, 13f and 14f to compare terminal voltage of the temperature sensor 11b by using, as reference voltage, divided voltage in a series circuit including a plurality of voltage dividing resistors 12a to 12d and a temperature setting variable resistor 12e.

A transmit portion 15 of a contactless output portion includes voltage dividing resistors 15a, 15b to divide output voltage from the operation part 12, a transistor 15c whose base is connected to a voltage dividing point therebetween, and a photodiode 15d connected to a collector of the transistor 15c. Further, a transmit portion 16 of a contactless output portion has the same structure. A transmit portion 17 of a contactless output portion has the same structure as that of the transmit portion 15 or 16 of another contactless output portion except that a collector of a transistor 17c is connected to the resistor 19f of the regulator circuit 19, and no photodiode is used.

For transmission and reception, photo-couplers are formed by the receiving phototransistors 7f and 8f in the receive portions 7 and 8 of the contactless output portions, and the transmitting photodiodes 15d and 16d in the transmit portions 15 and 16 of the contactless output portions. The photo-couplers are employed to remove noises. If the noises cause no problem, the invention can be embodied with no photo-coupler as is apparent from the fact that a control signal can be sent from the transistor 17c in the transmit portion 17 of the contactless output portion to the thyristor 9c in the receive portion 9 of the contactless output portion.

Further, the series circuit including the resistor 19b, the Zener diode 19g and the diode 19c, forms a delay circuit R1, and the series circuit including the resistor 18i, the Zener diode 18k and the diode 18j, forms a delay circuit R2.

Figure 3A:
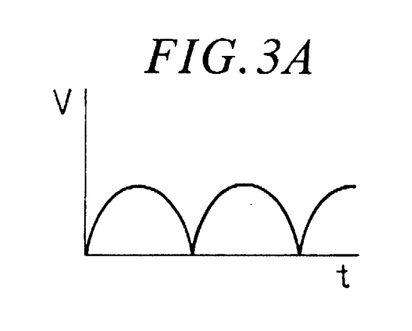
FIGS. 3A to 3C are diagrams showing a wave form of output voltage in each section of a direct current conversion circuit.
Figure 3B:
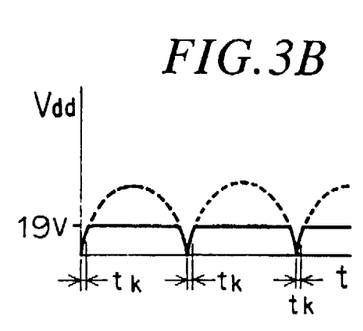
Figure 3C:
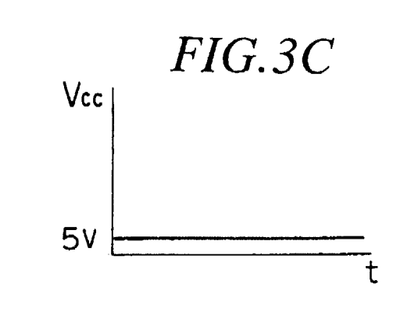

A description will now be given of the operation. Initially, when the power source switch S is closed, an ac power source 2 feeds power to the diode bridge 9a in the receive portion 9 of the contactless output portion through a coil 1a of a fan motor 1. At this time, since all the thyristors 7c, 8c, and 9c are OFF, the fan motor 1 is not rotated. DC output converted in the diode bridge 9a is charged in the FET transistor 18a of the voltage regulating circuit 18, and the charged voltage is fed through the delay circuits R2 to the transmit portions 15 and 16 of the contactless output portions, and through the resistor 18b, Zener diode 18c and diode 18d to the regulator circuit 19. In this case, output voltage from the diode bridge 9a has a full-wave rectified wave form as shown in FIG. 3A. However, voltage Vdd to be supplied to the transmit portion of the contactless output portion is limited by the Zener diode 18g and the FET transistor 18a, resulting in dc voltage of, for example, 19 volts as shown in FIG. 3B. In this case, current (of, for example, 5 mA) flowing in the direct current conversion circuit is too small to reach current required for rotation of the motor. Therefore, even when current flows in the coil 1a of the fan motor 1 through the diode bridge 9a, and the wires 103a, 103d, the motor can not be rotated. Further, since the voltage Vcc fed from the regulator circuit 19 to the temperature measuring portion 11 and the operation parts 12 to 14 is smoothed in the capacitor 19h and limited in the Zener diode 19j, stable dc voltage of, for example, 5 volts as shown in FIG. 3C is provided with for the temperature measuring portion 11 and the operation parts 12 to 14.

In the operation parts 12 to 14 receiving power from the regulator circuit 19, the comparing circuits 12f, 13f and 14f compare a set voltage determined by the voltage dividing resistors 12a to 12d and the temperature setting variable resistor 12e with terminal voltage of the temperature sensor 11b by which a room temperature is measured.

As a result, when output is generated from, for example, the comparing circuit 14f, the transistor 17c conducts in the transmit portion 17 of the contactless output portion in response to the output. This causes the transistor 19a in the regulator circuit 19 to conduct, and causes the thyristor 9c in the receive portion 9 of the contactless output portion to conduct through the resistor 19b, the diode 19c, and the Zener diode 19g. Thus, current flows in the coil 1a of the fan motor 1 through the thyristor 9c so that the fan motor 1 can be driven at a velocity according to the current.

On the other hand, when the thyristor 9c is conducting, electric charge charged in the capacitor 19h can not be discharged since a charging path of the capacitor 19h is connected to the Zener diodes 18g and 19g, and the diodes 18d and 19d. Consequently, the above constant dc voltage can stably be applied to the operation parts 12 to 14.

More specifically, the transistor 17c is turned ON in response to output from the comparing circuit 14f. As a result, the transistor 19a is turned ON to apply voltage illustrated in FIG. 3B to the Zener diode 19g. Since the Zener diode 19g has predetermined breakdown voltage $V_K$, the Zener diode is not turned ON for an interval $t_K$ in which voltage rises from zero to $V_K$. When the voltage reaches $V_K$, the Zener diode is turned ON to turn ON the thyristor 9c. Therefore, for the interval $t_K$, no power is supplied to the fan motor. In other words, power is supplied to the fan motor after the elapse of delay timing $t_K$ generated by the delay circuit. Thus, the capacitor 19h can sufficiently be charged within the delay timing $t_k$ so as to stably actuate the operation parts 12 to 14, and the transmit portions 15 to 17 of the contactless output portions. In this case, pulsating current as shown in FIG. 3A is applied to the thyristor 9c so that the thyristor 9c is turned OFF in the process of voltage drop for each cycle, and the above operation is repeated for each cycle.

In the transmit portions 15 and 16 of the contactless output portions, the photodiodes 15d and 16d output control signals (i.e., trigger signals for the thyristors 7c and 8c). The Zener diode 18k is mounted to delay output timing of the photodiodes, and has the same operation as that of the above Zener diode 19g.

As described above, according to the present embodiment, the fan motor 1 is full-automatically controlled according to set temperature without using a rotary switch 71 for manually changing air flow.

Embodiment 3

Figure 4:
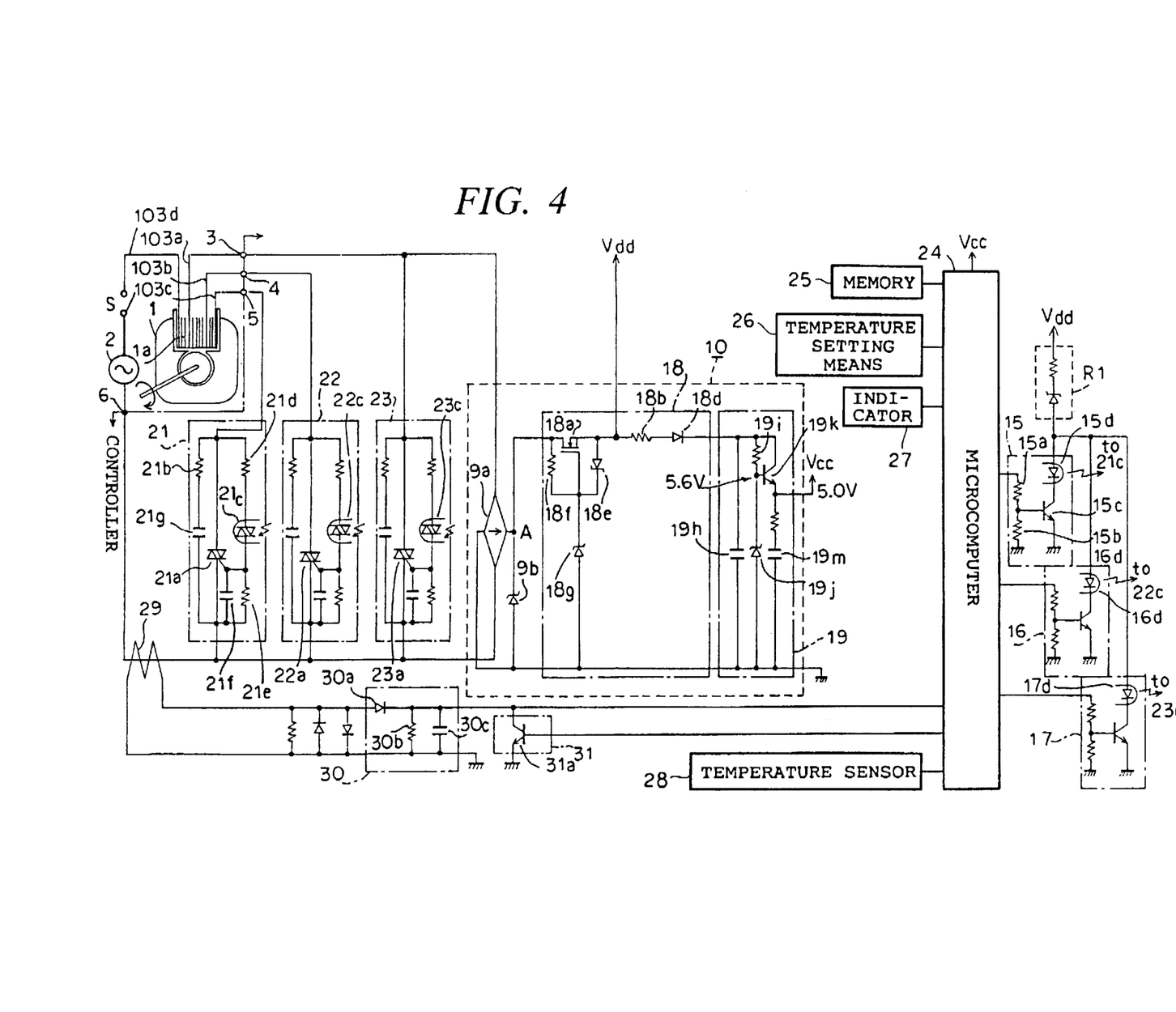
FIG. 4 is a circuit diagram showing an air conditioning control unit according to the third embodiment of the present invention.

In the structure of the second embodiment, higher load current (fan motor driving current) is applied to the diode bridges and the thyristors, resulting in a higher heat value. In order to avoid the higher heat value, in the third embodiment, as shown in FIG. 4, receive portions 21 to 23 of contactless output portions are formed by using triacs 21a to 23a and photo triacs 21c to 23c instead of the diode bridges and the thyristors in the second embodiment, and an operation part includes a microcomputer 24. The microcomputer 24 is connected to a memory 25, temperature setting means 26, an indicator 27 to indicate an operation state of a fan motor, and a room temperature sensor 28 to detect a room temperature.

In FIG. 4, reference numeral 29 means current detecting means such as current transformer, for detecting current flowing in the fan motor, and 30 is a peak hold circuit to hold output from the current detecting means 29. The peak hold circuit 30 includes, for example, a diode 30a, a resistor 30b, and a capacitor 30c, and sends output to the microcomputer 24. Reference numeral 31 means a reset switch for the peak hold circuit 30, including, for example, a transistor 31a which can conduct by receiving a reset signal from the microcomputer 24.

Further, in the present embodiment, photodiodes 15d to 17d in transmit portions 15 to 17 of contactless output portions are paired with the photo triacs 21c to 23c in the receive portions 21 to 23 of contactless output portions (to form photocouplers). Thus, a regulator circuit 19 has a more simplified structure than that in the second embodiment. Further, the same reference numerals are used for remaining component parts identical with those in the second embodiment, and descriptions thereof are omitted.

A description will now be given of the operation in the third embodiment. Initially, when a power source switch S is closed, an ac power source 2 feeds power through a coil 1a of the fan motor 1 to a diode bridge 9a included in a direct current regulated circuit 10. The current is converted in the diode bridge 9a into direct current to be fed to the regulator circuit 19 through an FET transistor 18a and a resistor 18b in a voltage regulating circuit 18, resulting in charge of a capacitor 19h.

The regulator circuit 19 feeds output voltage Vcc to the microcomputer 24. In the microcomputer 24, a prestored program is executed to determine an air flow of the fan motor 1 depending upon a set value of the temperature setting means 26 and a detected value of the temperature sensor 28, and cause conduction of a photodiode corresponding to the air flow, such as photodiode 17d in the photocoupler of the transmit portion 17 of the contactless output portion. As one illustrative control, the following automatic control method is available in which the air flow can automatically be changed over depending upon the difference between a set room temperature and a measured room temperature.

| MODE | TEMPERATURE | AIR FLOW |
| --- | --- | --- |
| BLOWING MODE | | LOW |
| COOLING MODE | SET TEMP + 1° C. ≦ ROOM TEMP | HIGH |
| | SET TEMP < ROOM TEMP < SET TEMP + 1° C. | INCREASING STEP |
| | ROOM TEMP ≦ SET TEMP | DECREASING STEP |
| HEATING MODE | ROOM TEMP ≦ SET TEMP − 1° C. | HIGH |
| | SET TEMP − 1° C. < ROOM TEMP < SET TEMP | INCREASING STEP |
| | SET TEMP ≦ ROOM TEMP | DECREASING STEP |

Consequently, the photo triac 23c is operated in response to light emitted from the photodiode 17d, and this causes the triac 23a to receive a start signal at a gate, resulting in conduction. Thus, a current flow is generated in the fan motor 1 through the triac 23a. Since the triac 23a can conduct alternating current, it is possible to eliminate the need for the diode bridges 7a and 8a which are required in the second embodiment (FIG. 2). In addition, the diode bridge 9a of the third embodiment (FIG. 4) is used only to feed very small power to the microcomputer 24, and so forth, and is not used to cause current (higher current) to drive the fan motor unlike the diode bridge 9a of the second embodiment. Therefore, in the third embodiment, no high current flow is caused in the diode bridge, thereby causing no heat problem due to forward voltage drop of the diode bridge. Though the diode bridges 7a to 9a, and the thyristors 7c to 9c serve as heating elements in the second embodiment (FIG. 2), only the triacs 21a to 23a serve as heating elements in the third embodiment (FIG. 4). As a result, a heat value can be reduced to substantially half a heat value of the second embodiment.

Figure 5:
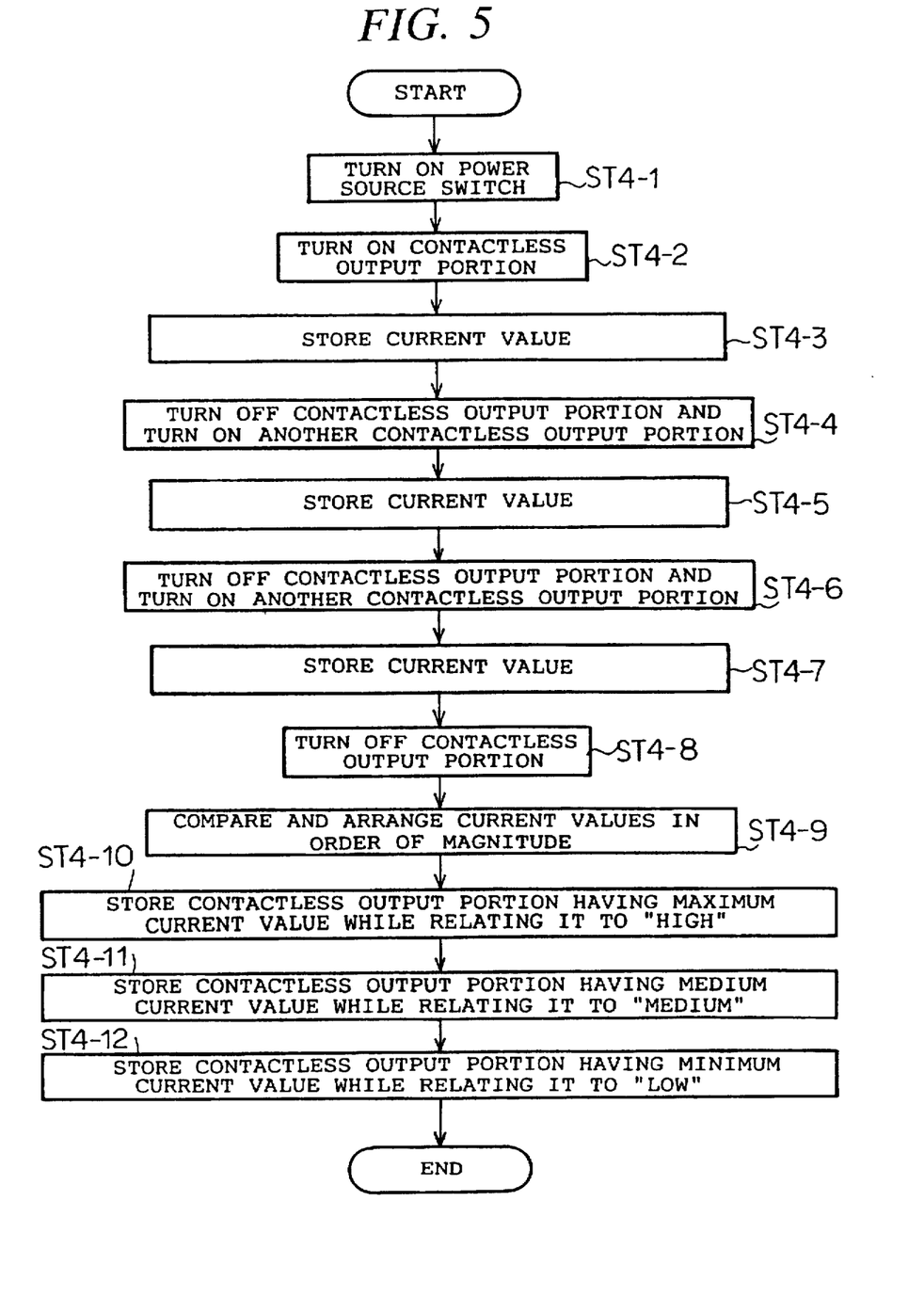
FIG. 5 is a flowchart illustrating the operation to make a decision of a connection relationship in a coil of a fan motor.

A description will now be given of the operation of decision of a connection relationship between fan motor revolution change-over terminals and control terminals 3 to 6 with reference to a flowchart of FIG. 5. Initially, when the power source switch S is closed (ST4-1), the operation is automatically changed over to a setting mode in which the following operation is started. The receive portion 21 of the contactless output portion is turned ON (ST4-2). Subsequently, the current detecting means 29 detects current flowing during the ON time, and the detected value is stored in the memory 25 through the microcomputer 24 (ST4-3).

Then, the receive portion 21 of the contactless output portion is turned OFF, and the receive portion 22 of the contactless output portion is turned ON (ST4-4). A value of current flowing during the ON time is detected to be stored in the memory 25 (ST4-5). Similarly, the receive portion 22 of the contactless output portion is turned OFF, and the receive portion 23 of the contactless output portion is turned ON (ST4-6). A value of current flowing during the ON time is detected to be stored in the memory 25 (ST4-7), thereafter turning OFF the receive portion 23 of the contactless output portion (ST4-8). It is to be noted that, before measuring the current values, the reset switch 31 should be turned ON to reset the peak hold circuit 30.

After detecting and storing current flowing in all the receive portions of the contactless output portions as described above, all the stored current values are arranged in the order of the magnitude thereof by comparison (ST4-9). The receive portion of the contactless output portion having the maximum current value is stored while relating it to "High" (ST4-10), and the receive portion of the contactless output portion having a medium current value is stored while relating it to "Medium" (ST4-11). Further, the receive portion of the contactless output portion having the minimum current value is stored while relating it to "Low." When the above operation is completed, the operation automatically leaves the setting mode to return to a normal mode (ST4-12). In a subsequent operation, the fan motor may be actuated according to the above relationship, and wires other than common wires may be connected in a desired manner as long as the common wires are connected correctly.

In the embodiment of FIG. 1, the fan motor 1 and the control valve 78 serving as control loads are controlled by one common contactless output portion 72. However, it must be noted that the fan motor 1 may be removed, and only the control valve 78 may be controlled. Alternatively, it is also possible to connect exclusive contactless output portions to each of the fan motor 1 and the control valve 78 so as to control them independently.

Embodiment 4

Figure 6:
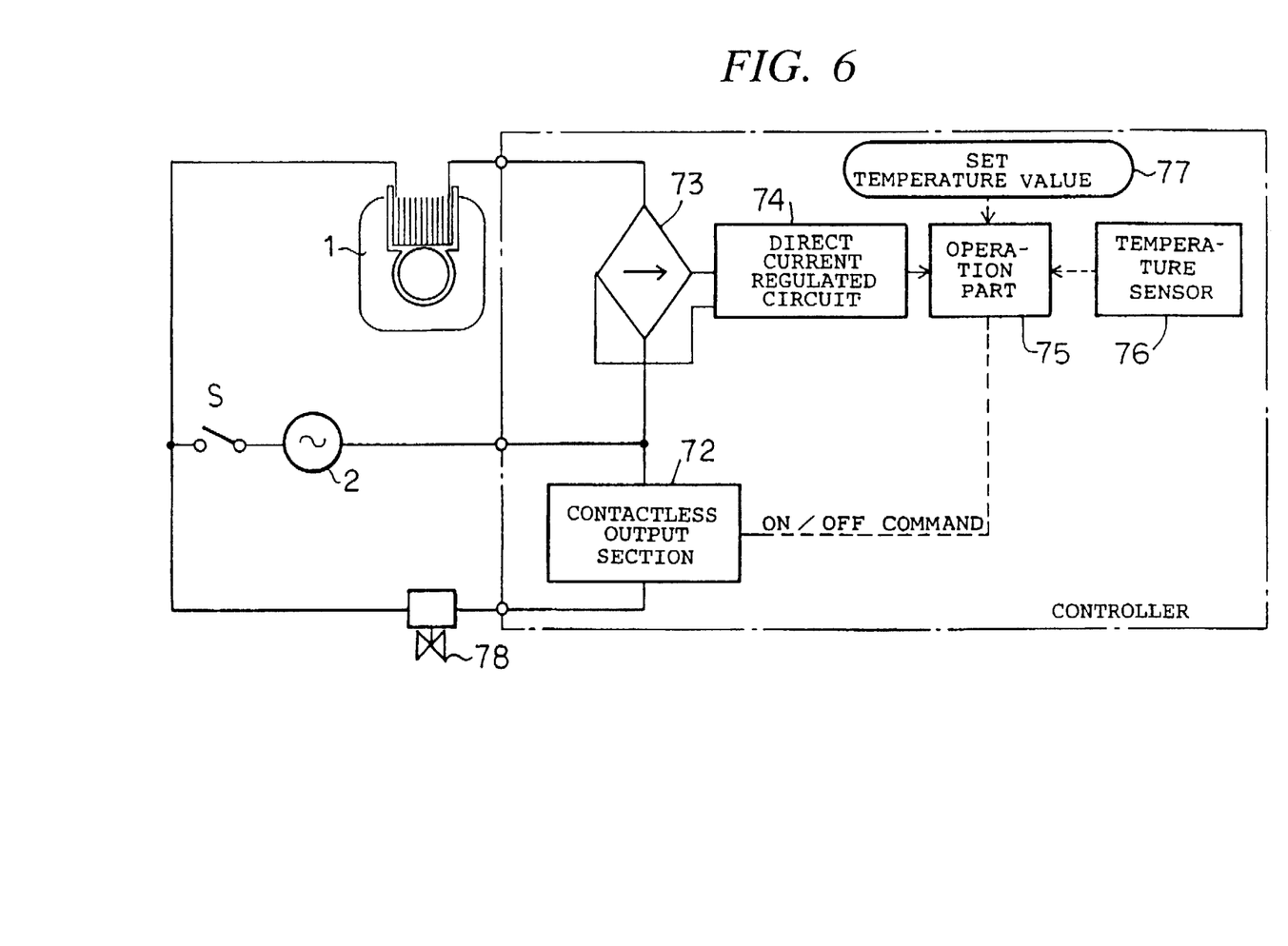
FIG. 6 is a circuit diagram showing an air conditioning control unit according to the fourth embodiment of the present invention.

FIG. 6 is a block diagram showing another embodiment. A fan motor 1 is connected to an ac power source 2 through a diode bridge 73 to continuously be rotated at a constant velocity, and a control valve 78 is connected to the ac power source 2 through a contactless output portion 72. The contactless output portion 72 is controlled by an ON/OFF command from an operation part 75.

What is claimed is:

1. An air conditioning control unit comprising:
   a contactless output section for selectively completing a circuit between an ac power source and a load so as to drive said load in response to a command signal;
   current conversion means, coupled to said circuit, for converting ac current flowing through said load from said ac power source to dc current; and
   an operation part receiving power from said current conversion means, and comparing a measured room temperature with a set temperature so as to produce and feed the command signal to said contactless output section solely as a function of a predetermined result of said comparison.

2. An air conditioning control unit according to claim 1, further comprising air flow changing means having a plurality of revolution change-over terminals for changing revolution of a fan motor as the load and a common terminal connected to one of said revolution change-over terminals,
   wherein the contactless output section makes the circuit including the ac power source through the common terminal of said air flow changing means.

3. An air conditioning control unit according to claim 1, wherein the contactless output section comprises a plurality of contactless output portions, each having a diode bridge connected between each of a plurality of revolution change-over terminals for changing revolution of a fan motor as the load and the ac power source, and a thyristor connected with an output side of said diode bridge and conducting in response to the command signal;

the current conversion means is connected to one of said revolution change-over terminals; and the operation part comprises an automatic adjusting means for determining a revolution change-over terminal to be connected with the common terminal among said revolution change-over terminals according to the difference between the measured room temperature and the set temperature, and providing the command signal for the contactless output portion corresponding to the revolution change-over terminal to be connected with the common terminal.

4. An air conditioning control unit according to claim 1, wherein the contactless output section comprises a plurality of contactless output portions, each having a triac connected between each of a plurality of revolution change-over terminals for changing revolution of a fan motor as the load and the ac power source, and means for making the triac to be conducted in response to the command signal;

the current conversion means is connected to one of said revolution change-over terminals; and the operation part comprises an automatic adjusting means for determining a revolution change-over terminal to be connected with the common terminal among said revolution change-over terminals according to a difference between the measured room temperature and the set temperature, and providing the command signal for the contactless output portion corresponding to the revolution change-over terminal to be connected with the common terminal.

5. An air conditioning control unit according to claim 4, wherein the operation part includes means for determining a relationship of connections between the load and each of the plurality of revolution change-over terminals based on a current value through each triac.

6. An air conditioning control unit according to claim 1, including a delay circuit to delay transmitting timing for the command signal to the contactless output section.

7. An air conditioning control unit according to claim 2, including a delay circuit to delay transmitting timing for the command signal to the contactless output section.

8. An air conditioning control unit according to claim 3, including a delay circuit to delay transmitting timing for the command signal to the contactless output portions.

9. An air conditioning control unit according to claim 4, including a delay circuit to delay transmitting timing for the command signal to the contactless output portions.

10. An air conditioning control unit according to claim 5, including a delay circuit to delay transmitting timing for the command signal to the contactless output portions.

11. An air conditioning control unit as set forth in claim 1, wherein said load comprises a fan motor for driving a fan.

* * * * *